April 3, 1951

L. THOMPSON

MEANS FOR DAMPING VERTICAL MODULATIONS OF PHONOGRAPH RECORDERS

Filed Jan. 15, 1945

2,547,725

INVENTOR.
Lincoln Thompson
BY
H. G. Manning
Attorneys

Patented Apr. 3, 1951

2,547,725

UNITED STATES PATENT OFFICE 2,547,725

MEANS FOR DAMPING VERTICAL MODULATIONS OF PHONOGRAPH RECORDERS

Lincoln Thompson, Cheshire, Conn., assignor to The Soundscriber Corporation, New Haven, Conn., a corporation of Connecticut Application January 15, 1945, Serial No. 572,912

1 Claims. (Cl. 274—39)

This invention relates to sound recording apparatuses and more particularly to an improved means for damping and suppressing undesired vertical vibrations of the recording stylus head as it travels along the spiral groove of a thin disk phonograph record.

One object of the present invention is to provide an apparatus of the above nature which will prevent low frequency rumblings due to undesired vertical modulations and vibrations of the recording stylus and the recording head which is mounted in its supporting arm.

A further object is to provide an apparatus of the above nature which will reduce the effects of the wrinkling of the thin disk record ahead of the recording stylus and thereby reduce the vertical modulations of the recording head.

A further object is to provide an apparatus of the above nature comprising a sponge rubber ring located under the rim of a record-supporting turntable shell.

A further object is to provide an apparatus of the above nature in which the sound groove will be recorded with more uniform depth, whereby the tracking of the recording stylus and also the reproducing stylus will be improved.

A further object is to provide an apparatus of the above nature which will dampen vertical vibrations of the recording head caused by dust under the record and will prevent shock excitation effects from arising therefrom.

A further object is to provide an apparatus of the above nature which will act as a filter for vibrations emanating from the turntable driving motor.

A further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In recording sound on thin disk phonograph records by the indenting and embossing groove method, undesired vertical modulations of the recording stylus sometimes cause rumbling noises to be recorded. Such modulations are probably caused by the wrinkling of the disk by the recording stylus and the subsequent periodic release of said wrinkling at a rate depending upon the natural period of oscillation of the recording head in its supporting arm.

This causes the recorded groove to have a plurality of lateral scalloped portions which vary both in width and depth due to the vertical oscillating movements of the recording stylus. Under some circumstances, the oscillations of the recording head will be so strong that the stylus will actually leave the record surface.

The undesired undulations in the groove due to vertical modulations are quite symmetrical laterally, so that the normal reproduction thereof should not theoretically be affected. Practically, however, during playback some undesired lateral oscillations are produced which result in noise in playback. By means of the present invention, the undesired vertical modulations are considerably damped and the overall reproduction will be greatly improved.

Figure 1:
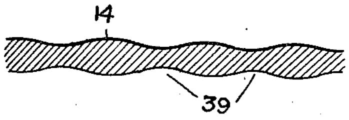
Fig. 1 represents a plan view on an enlarged scale of a short portion of a record groove showing the effects of undamped vertical modulations of the recording head and stylus.

The appearance of a recorded groove in plan view with undesired vertical modulations is shown on Fig. 1 of the drawing, and it will be noted that said groove has a repeating pattern due to the periodic repetition of the vertical modulation.

In order to overcome the effects of vertical modulation, it is one purpose of the present invention to dampen the vertical movements of the recording stylus so that the natural period of the vibrating recording head will be less predominant.

One method of damping such vertical modulation was disclosed in applicant's prior Patent No. 2,354,558, of July 25, 1944, entitled "Stylus Head Mountings for Dictating Machines," where the recording head was mounted in frictional pivot bearings in its supporting arm.

The present invention accomplishes a still further damping of the vertical modulation by providing a sponge rubber ring underneath the rim of the turntable shell upon which the record is supported.

This sponge rubber ring acts as an additional damper for the vertical oscillations of the recording head since the light record supporting shell, resting upon said ring, will engage a relatively large area of said sponge rubber ring for damping purposes. The sponge rubber ring also serves to insulate the shell from the motor vibrations.

In order to reduce the friction clutch effect of the sponge rubber ring on the shell, a felt coating may be applied upon the top of said ring. A cork ring is also preferably located within the rubber ring with its upper surface slightly below the upper level of said rubber ring so as to provide a safety factor in case of packing down of the sponge rubber ring by continued use.

Referring now to the drawing in which like reference numerals denote corresponding parts throughout the several views, the numeral 10 indicates a circular turntable shell having a depending flange 11, said shell being preferably formed of low density plastic material such as "Bakelite." The turntable shell 10 is provided with a central upstanding square post 12 and is adapted to receive a thin disk record 13 having a square central aperture fitted around said post and formed of any suitable material. One type of such a record is described in a prior Reissue Patent No. 22,183, granted to Lincoln Thompson on September 22, 1942, and entitled "Apparatus for Recording Sound on Thin Disks."

The record 13 is adapted to have a spiral groove 14 indented and embossed therein by a recording stylus 15 which is adapted to be fed at uniform speed across the record 13, and being mounted in a suitable electrical recording head 16. The head 16 is preferably pivotally mounted on its center of gravity in friction bearings in a supporting arm 17, which in turn is mounted to swing about a vertical pivot post 18, upstanding from the phonograph chassis, not shown (see the Patent No. 2,354,588, mentioned above).

The recording head 16 is connected by means of a pair of conductors 19, 20 to the output of an amplifier 21, which in turn is connected by means of a pair of conductors 22, 23 to a microphone 24 for receiving the speech or other sounds to be recorded. A turntable 29 is adapted to be driven by means of a continuously running motor 25 which is operatively connected to a vertical turntable shaft 26 by means of a flexible coupling 27.

The shaft 26 is mounted to rotate in a cylindrical bearing 28 which is rigidly mounted on the machine frame (not shown). The shaft 26 is rigidly connected as by a set screw 26*a* to the turntable 29 of relatively heavy material.

The turntable 29 is provided at its periphery with a wide depressed outer shoulder 30 and a narrow inner shoulder 31, arranged in stepped formation, as shown, for receiving an outer sponge rubber damping ring 32 and an inner cork safety ring 33, respectively. Both of said rings 32, 33 are preferably of rectangular cross section, the inner cork ring 33 being only about half the thickness of the outer sponge rubber ring 32. Moreover, the top surface of the cork ring 33 is depressed about .015" below the top of the rubber ring so as not to interfere with the cushion damping action of the latter upon the shell 10.

In order to reduce sudden clutching effects of the sponge rubber ring 32 upon the Bakelite shell 10, a coating of powdered felt 32*a* or other smooth slippery material will preferably be applied to the top surface of the sponge rubber ring 32.

Figures 7, 8:
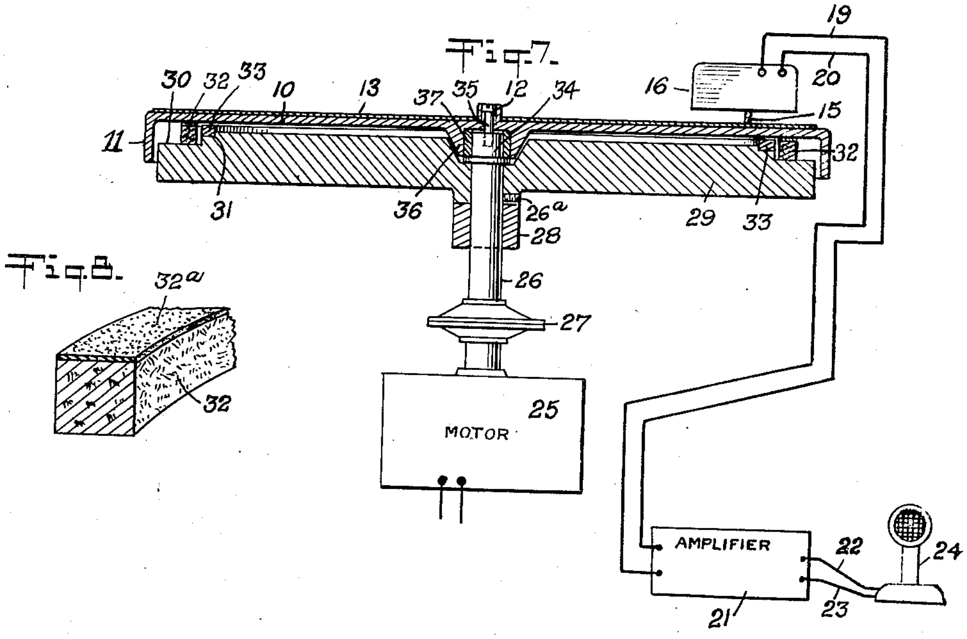
Fig. 7 is a schematic view of the apparatus showing the stylus-carrying recording head, the record-supporting turntable, the sponge rubber and cork rings, the amplifier, the microphone, and the wiring connections therebetween.
Fig. 8 is a sectional perspective view of a portion of the sponge rubber ring.

The shell 10 is detachably secured loosely to the upper end 34 of the shaft 26 by means of a headed screw pin 35 passing through the post 12, as clearly shown in Fig. 7. The shell 10 also has a depending integral hollow conical hub 36 which embraces a collar 37 mounted on the top of the shaft 26.

*Operation*

Figure 2:
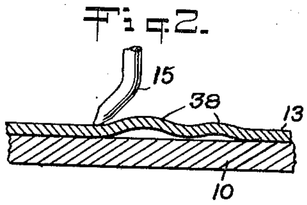
Fig. 2 is a vertical sectional view of a recording stylus as it appears when resting upon a portion of a thin disk record supported by a turntable shell, and showing the undesired vertical wrinkling caused by the pressure of the recording stylus thereon, said section being taken on a line parallel to the sound groove.
Figure 3:
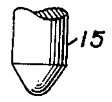
Fig. 3 is a side view of the round-pointed end of the recording stylus shown on a larger scale.
Figures 4, 5:
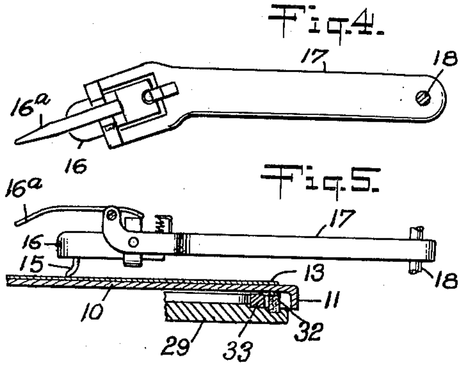
Fig. 4 is a plan view of the recording arm with a stylus-carrying head pivotally mounted on its center of gravity in the forked forward end of said arm.
Fig. 5 is a side view of the same, partly in section showing a portion of the underlying disk record, the turntable shell, the sponge rubber damping ring, the inner cork safety ring, and the supporting turntable.
Figure 6:
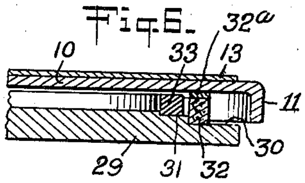
Fig. 6 is a sectional view on a larger scale, of the edge portion of the disk record, the turntable shell, the sponge rubber and cork rings, and the underlying turntable.

In operation, when the stylus 15 is recording on the surface of the thin disk record 13, the effect of wrinkles 38 (Fig. 2) in said record which might otherwise result in undesired vertical modulations 39 (Fig. 1) of the stylus, is reduced greatly by the damping effect of the outer sponge rubber ring 32, as previously described.

The sponge rubber ring 32 also serves to dampen and suppress undesired vertical vibrations of the recording stylus head caused by dust, low frequency rumblings from the turntable-driving motor, the turntable shell brake, etc., which might otherwise cause shock excitation effects in the sound recorded on the disk record.

If the sponge rubber ring 32 should become worn, or packed down during use, the inner cork ring 33 will act as a safety device to prevent the turntable shell 10 from directly engaging the top of the turntable 29.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within scope of the following claim.

Having thus fully described the invention, what is claimed as new, and for which it is desired to secure Letters Patent, is:

In a phonograph, a continuously rotated relatively heavy driving turntable plate, a soft resilient flat-topped clutch ring of sponge rubber concentrically mounted upon said driving plate adjacent the outer edge thereof, a relatively light turntable shell mounted on said clutch ring, a thin disk record resting upon said shell, and a recording head carrying a ball-pointed embossing and indenting stylus exerting a high pressure upon said record, the clutch ring supporting said shell for damping and absorbing undesired vertical modulations in said recording stylus and head caused by wrinkling of said thin record in advance of said stylus.

LINCOLN THOMPSON.

REFERENCES CITED

The following references are of record in the file of this patent:

UNITED STATES PATENTS

| Number | Name | Date |
|---|---|---|
| 778,492 | Johnson | Dec. 27, 1904 |
| 1,163,566 | Scotford | Dec. 7, 1915 |
| 1,360,900 | Davis | Nov. 30, 1920 |
| 1,480,629 | Nolen | Jan. 15, 1924 |
| 1,904,490 | Mallina | Apr. 18, 1933 |
| 2,200,866 | Thompson | May 14, 1940 |
| 2,254,844 | Guedon | Sept. 2, 1941 |
| 2,278,680 | Thompson | Apr. 7, 1942 |